United States Patent

Khachikian

[11] 4,007,893
[45] Feb. 15, 1977

[54] HOMOCOPTER

[76] Inventor: Hariton Khachikian, 5322 Russell Ave., Apt. No. 1, Los Angeles, Calif. 90027

[22] Filed: Oct. 28, 1975

[21] Appl. No.: 626,577

[52] U.S. Cl. .................................. 244/64
[51] Int. Cl.² ............................... B64C 31/04
[58] Field of Search ............ 244/17.11, 64, 17.19

[56] References Cited

UNITED STATES PATENTS

| 1,061,870 | 5/1913 | Rodriguez | 244/64 |
| 1,379,522 | 5/1921 | Bruner | 244/64 |
| 2,704,192 | 3/1955 | Paul | 244/17.19 |
| 2,847,173 | 1/1956 | McCarty, Jr. | 244/17.11 |

FOREIGN PATENTS OR APPLICATIONS 420,302  1/1911  France ..................... 244/64

*Primary Examiner*—Trygve M. Blix
*Assistant Examiner*—Galen L. Barefoot

[57] ABSTRACT

The Homocopter is a small helicopter which can fly due to the human power only, i.e. the pilot who is "riding" this vehicle is realizing the rotation of the rotary wing of the helicopter using a pair of pedals and a gear system, through which the rotary wing rotates with sufficient revolutions per minute to create the lift, necessary for the motion of this vehicle through the air.

2 Claims, 2 Drawing Figures

HOMOCOPTER

SUMMARY OF THE INVENTION

The Homocopter looks like a combination between a monocycle and a helicopter, being a small and very light vehicle, enabling one to fly, rotating its rotary wing (a propeller composed by a hub on which are fixed two or more blades and the whole system rotating on an axel) by using the pedals, acted by his feet. The junction between the pedals and the blades is made through a pair of gears which has a double roll:

to transform the vertical rotation, given by the motion of the pedals into a horizontal one, necessary for the motion of the rotary wing.

to multiplicate the low RPM (revolutions per minute), given by the pedals, into a higher one, enough to create the lift and flight.

The invention has, at least, two main advantages:

scientifically, i.e. it proves that the human being has the possibility to fly, using his own natural muscular power.

practical, i.e. it can be used for many purposes like: a new kind of sport, now-a-days public transportation problem, etc.

DESCRIPTION OF THE INVENTION

Figure 1:
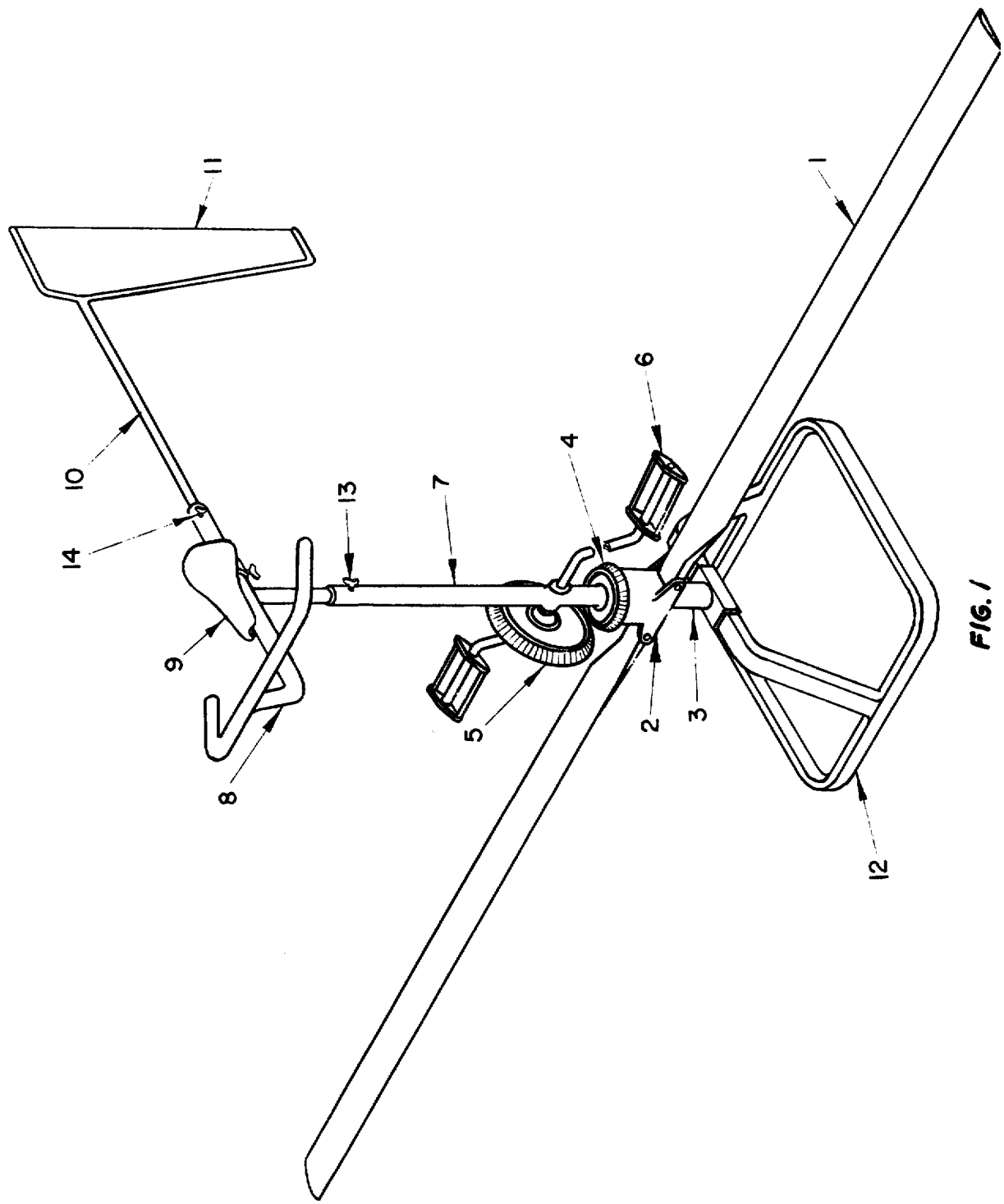
FIG. 1 is a perspective view of the Homocopter.

In the FIG. 1:

A propeller composed by two blades (1), fixed on the hub (2) is rotating on the axle (3), due to a pair of radial-axial anti-friction bearings, mounted into the hub (see the detailed drawing).

At the top, the hub is ended with a bevel gear (4), connected with a bigger bevel gear (5), which rotates in a vertical plane. This last gear is fixed on the axle of the pedals (6). It rotates into a horizontal bearing fixed on the main column (7), due to another pair of anti-friction bearings (see the detailed drawing)

At the top, the main column is connected with saddle support (8) by means of the adjustable screw (13). On this last support is assembled the saddle (9) (adjustable back and forth).

The bar (10) which is connected with the saddle support through the adjustable screw (14), having at the opposite end the fin (11), which keeps the vehicle on its straight flight direction against counterwise yawing couple developed during the rotation of the rotor.

The entire vehicle is mounted on the landing support (12).

Figure 2:
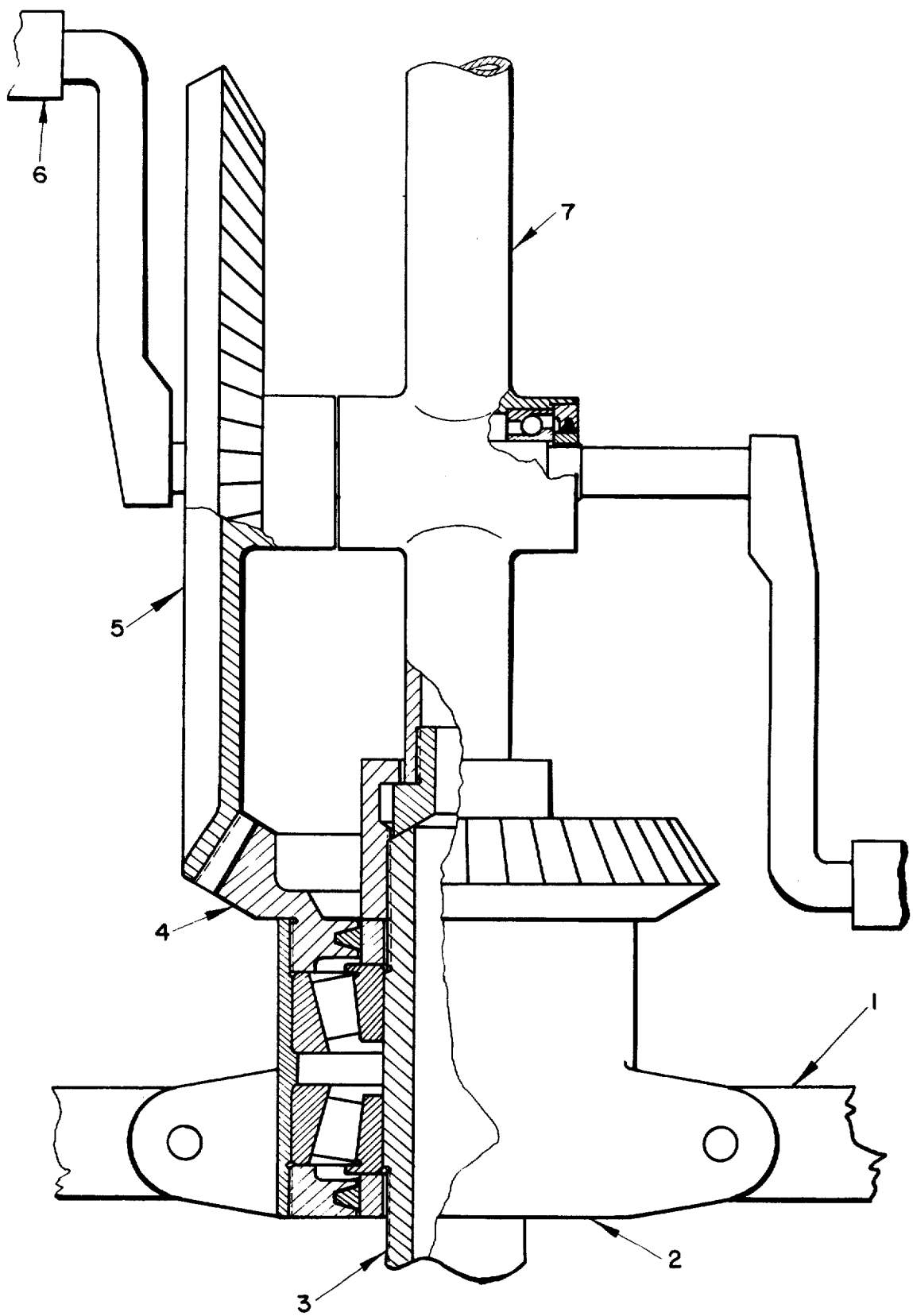
FIG. 2 is a detailed showing of the gear system used in the preferred embodiment.

In the FIG. 2:

In this drawing it's shown the detailed assembly of the motion system, composed by: hub, gears, main axle, pedals and their axle, etc. In the broken view section it can be seen how the bearings are mounted, how the connection between the main axle (3) and main column (7) is realized, etc.

The basic structure is made out of aluminium tubing, except the axle (main) and the supports (7) and (8), made out of steel tubing.

The gears and hub are made out of steel.

The blades are made out of plywood.

The pedals and the saddle are those used on the bicycles.

The fin is realized by a light tubing frame covered by a piece of cloth.

The whole vehicle is calculated such as to be as light as possible.

The main dimensions are calculated as follows:

The gear system is calculated based upon the theory of mechanism, to accomplish the required ratio of rotations, as well as to get the required forces and moments.

The rotary wing are calculated based upon the aerodynamical theory of the helicopter, which gives the dimension of the blades, the pitch angle, the number of revolutions per minute necessary to create the lift. Meantime, the blades are calculated to overcome the drag and momentum, regarding the necessary motion power, and at the centrifugal force, regarding the strength of the blade at the main longitudinal force and, in the same time, regarding the stability of the vehicle during the flight, based upon the principle of the gyroscope.

The static stability can be realized by adjusting the saddle according to the pilot's weight, back or forth, such as the center of gravity of the assembly vehicle-pilot to coincide with the main column (axis of rotation of the blades).

During the flight, the pilot can change the direction of flight by moving his center of gravity, a little, to the desired side (left or right). To realize a forward flight, it's enough if the c.o.g. of the pilot is moved a little bit forth. For landing purpose, the pilot should be in hover (being "suspended" in a fix point into the air, i.e. the vehicle is horizontal and not inclined with respect to the ground) and than he has to slow down the pedals rotation, little by little, until the vehicle touches the ground.

I claim:

1. A flying vehicle comprising a main column; a rotary wing assembly composed by two blades connected both to a central hub, which rotates on a main axle, said main axle being connected to the lower end of said main column; a landing support being fixed at the lower end of said main axle; an assembly composed by a pair of pedals and a main bevel gear fixed on the same axis of rotation as the pedals and this assembly rotates in a transversal bearing provided in the main column, above the hub; said bevel gear is connected to a secondary bevel gear fixed on the upper side of the hub and makes possible direct transmission of the human power from the pedals to the rotary wing.

2. The flying vehicle of claim 1 wherein said main column has a saddle support fixed on its upper side; an adjustable saddle positioned in the middle of said paddle support (above said main column); a fin support bar fixed at the rear of said saddle support and said saddle being adjustable for shifting the center of gravity of said vehicle.

* * * * *